United States Patent [19]

Gallus et al.

[11] 4,083,435
[45] Apr. 11, 1978

[54] BRAKE DISC WITH IMPROVED VENTILATION COOLING

[75] Inventors: Heinz Gallus, Aachen-Richterich in der Schonau; Willi Klein; Hans Zeuner, both of Remscheid, all of Germany

[73] Assignee: Bergische Stahl-Industrie, Remscheid, Germany

[21] Appl. No.: 767,671

[22] Filed: Feb. 11, 1977

[30] Foreign Application Priority Data

Feb. 11, 1976 Germany .............................. 2605333

[51] Int. Cl.² .............................................. F16D 65/12
[52] U.S. Cl. ........................... 188/218 XL; 188/264 A
[58] Field of Search ............. 188/59, 218 R, 218 XL, 188/264 A, 264 AA; 192/107 R

[56] References Cited

U.S. PATENT DOCUMENTS

| | | | |
|---|---|---|---|
| 2,255,024 | 9/1941 | Eksergian | 188/218 XL |
| 3,187,851 | 6/1965 | Dean | 188/218 XL |
| 3,933,228 | 1/1976 | Otto et al. | 188/218 XL |

Primary Examiner—Duane A. Reger
Attorney, Agent, or Firm—Walter Becker

[57] ABSTRACT

A brake disc with improved ventilation cooling means, comprising a brake ring, the interior of which is provided with radially running channels formed by vanes. Cooling air to be conveyed by the vanes enters the channels on the hub side at the inner circumference of the brake ring and exits at the outer circumference of the brake ring. In addition to rib-shaped vanes, the length of which correspond to the entire width of the brake ring, thermal flow vanes are provided. To increase the air turbulence, the width of the base of the thermal flow vanes is more than 60% of the distance from the start of one vane to the start of the next vane, measured along the braking radius, and the width of the base of the thermal flow vanes is between 80 and 100% of the distance between vanes, measured at the inner circumference of the brake ring. Moreover, the thermal flow vanes have recesses and, to increase the air throughput, a ratio of air intake cross section to air exit cross section of less than 1:2 up to at most 1:1 is maintained.

5 Claims, 7 Drawing Figures

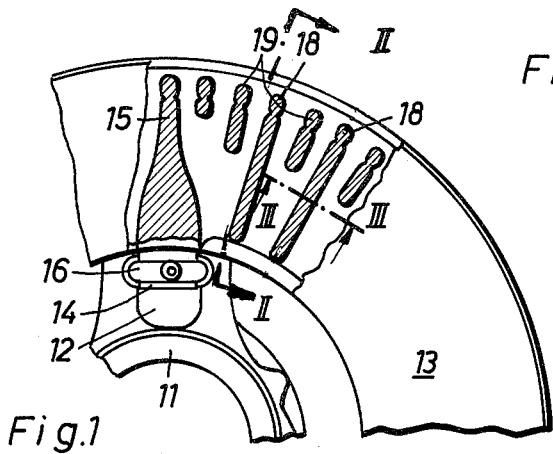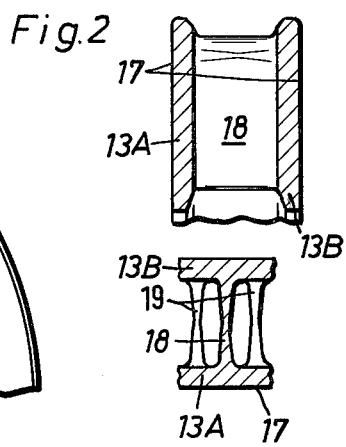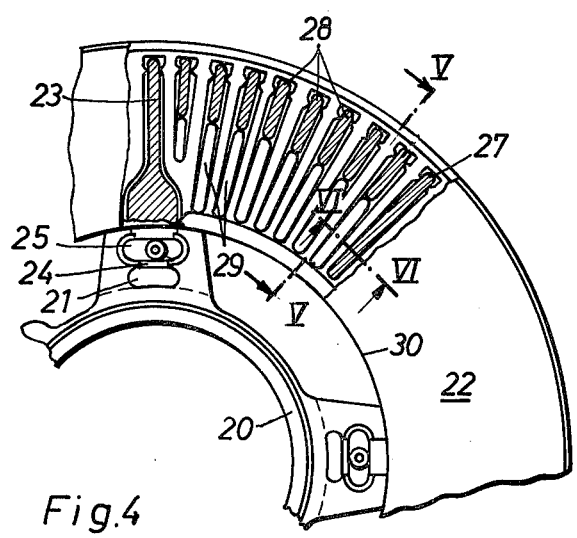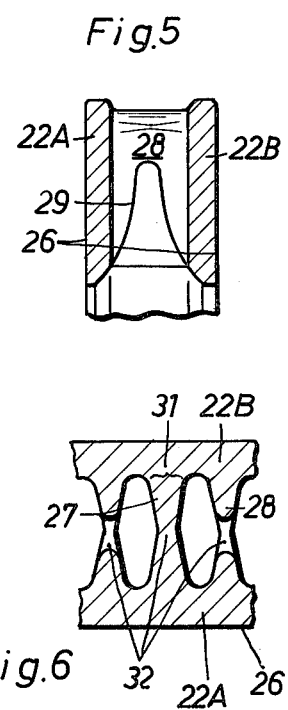
Fig.1 Fig.2 Fig.3 Fig.4 Fig.5 Fig.6

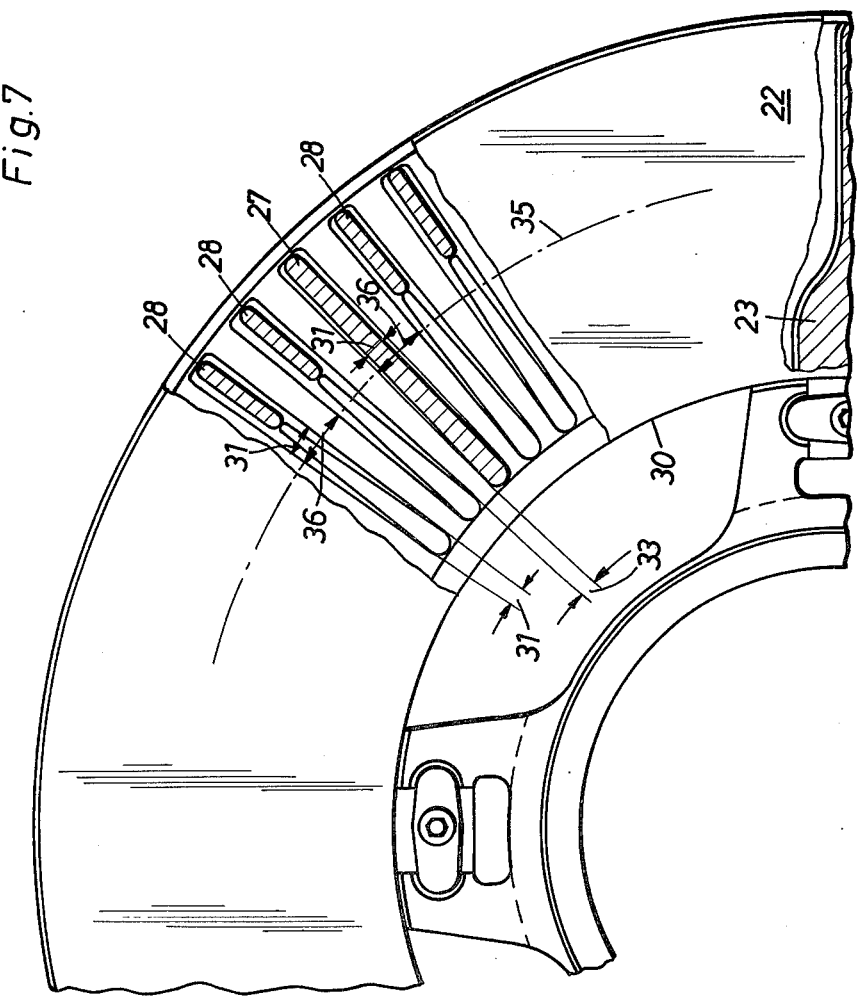

BRAKE DISC WITH IMPROVED VENTILATION COOLING

The present invention relates to a disc brake with an improved ventilation cooling, comprising a brake ring, the interior of which is provided with radially running channels formed by vanes. Cooling air to be conveyed by the vanes enters the channels at the hub side, inner circumference of the brake ring and exits at the outer circumference of the brake ring.

The heretofore known disc brakes for rail vehicles have an automatic ventilation cooling whereby air flows through the interior channels when the brake disc rotates. Regardless of whether the brake discs are made of cast steel or comprise a cast steel hub with a cast iron brake ring, until now an effort was made, when constructing the ventilation space, to arrange as many radial air conveying vanes as was technically possible and at the same time to make the vane walls thin. It was assumed that a large number of ventilation vanes also allowed a large amount of air to flow through the ventilation channels of the disc brakes. The small wall thickness of the vanes followed automatically for structural reasons.

When braking or slowing down larger vehicle weights, using smaller wheels and thereby smaller disc brakes, when braking from high speeds as well as braking often in high speed short distance operation, a drawback of the heretofore known ventilation cooling becomes apparent, because it becomes increasingly difficult to so control the operating temperature that a proper braking action can be realized with organically connected friction linings as well as over a sufficient life span of the brake linings. It is expedient to not exceed an average disc brake temperature of about 375° C, in order to avoid temperature fading and undue lining wear. It has been determined that every reduction of the average disc brake temperature down to about 280° C results in a very considerable decrease of the lining wear.

It is an object of the present invention to avoid the drawbacks of the known disc brakes and to achieve an improved ventilation cooling by a new construction of the cooling space.

These objects and advantages of the present invention will appear more clearly from the following specification in connection with the accompanying drawings, in which:

FIG. 1 is a partially sectioned side view of a known brake disc.

FIG. 2 is a section along the line II—II of FIG. 1.

FIG. 3 is a section along the line III—III of FIG. 1.

FIG. 4 is a partially sectioned side view of a brake disc pursuant to the present invention.

FIG. 5 is a section along the line V—V of FIG. 5.

FIG. 6 is a section along the line VI—VI of FIG. 4, and

FIG. 7 is a partially sectioned side view of a brake disc pursuant to the present invention shown on a larger scale than FIGS. 1 to 6.

The brake disc of the present invention is characterized primarily in that, in addition to the rib-shaped vanes, the length of which correspond to the entire width of the brake ring, thermal flow vanes are provided. To increase the air turbulence, the width of the base of the thermal flow vanes is more than 60% of the distance between the start of one vane to the start of another vane, measured along the braking radius, and the width of the base of the thermal flow vane is between 80 and 100% of the distance between vanes at the inner circumference of the brake ring. In addition, the thermal flow vanes have recesses and, to increase the air throughput, a ratio of the air intake cross section to the air exit cross section of less than 1:2 up to at most 1:1 is maintained.

Pursuant to a further feature of the invention, the rib-shaped and/or thermal flow vanes taper in the shape of a wedge towards the middle between the friction rings or discs.

The recess on the thermal flow vanes advantageously has a funnel-shaped, radially outwardly narrowing form which occupies at least half of but not more than three fourths of the radial vane length.

During construction of the ventilation space pursuant to the present invention, consideration has been given the fact that the air which flows through this space must carry off the heat from the back of the discs, which support the friction surfaces, and out of the vanes. For this purpose as great an amount of air as possible is required which turbulently flows through the cooling channels formed by the vanes, preferably with as little change in pressure as possible and with as little change in velocity as possible. Due to the reversing operation of the disc brakes, a curved form of the ventilation vanes cannot be used for improving conveying of air; only radial vanes are usable.

The amount of air which passes through the brake disc depends primarily on the size of the air intake cross section at the inner circumference of the brake ring. The larger this intake cross section is made, the more air that may pass through the ventilation channels. The air exit cross section should at most be twice as large as the air intake cross section. The air entering at the inner circumference is heated up as it flows through the cooling channels and accordingly increases in volume. In connection with the above mentioned ratio of the cooling channel cross sections, the thermal increase in volume of the air which flows through insures that only insignificant changes in pressure and thereby velocity occur when the air flows through the brake disc cooling channels.

A turbulent flowing of the cooling air, which has great significance for the heat transition from the surfaces of the cooling channels to the air which flows through, occurs to a particular extent in view of the design of the thermal flow vanes with the described recesses.

When designing the vanes, it has been taken into consideration that the heat produced during the energy change on the friction surfaces flows through the wall thickness of the friction rings to the cooling space surfaces, with regard to the thermal conductivity of the cast iron, at an axially declining gradient. Where the heat encounters the foot of a vane, it flows locally into the vane. In order to allow a lot of heat to flow out of the friction rings or discs into the vanes, the foot of the vanes must be wide in proportion to the axial length of the vane.

Referring now to the drawings in detail, FIGS. 1 to 3 show the known brake disc with the hub 11 which may be attached in a manner known per se to the axle (not shown). The hub 11 has three supporting arms which form clamping grooves 12. The connection between the brake ring 13 and the hub 11 is effected by the guiding strips 14 which are fastened or clamped into the grooves 12. The guiding strips 14 represent the extension of the vane 15 which extends beyond the inner circumference of the brake ring 13. The clamping groove 12 is closed off by the safety member 16 which somewhat tangentially bridges groove 12. The brake ring 13, pursuant to FIGS. 2 and 3, comprises two friction rings or discs 13A and 13B, which on their outer surfaces having rubbing or friction surfaces 17 and which are connected to one another by radial vanes 18 and 19. The length of the vanes 18 correspond approximately to the width of the discs 13A and 13B, while the length of the vanes 19 are shorter. As shown in FIG. 3, the vanes 18 and 19 have the same thickness over their entire axial width.

FIGS. 4 to 7 show the brake disc of FIGS. 1 to 3 modified pursuant to the present invention providing a brake ring with radial ventilation channels for conveying cooling air from an inner circumference of the brake ring to an outer circumference of the brake ring, the ratio of the cross section of the air inlet of the channels to the cross section of the air exit of the channels being between 1.1 and 1.2, at least some of the vanes extending over the inner width of the brake ring. The hub 20 is attached to the axle (not shown) and now has four clamping grooves 21, in which, for fastening the brake ring 22, the guiding strips 24, which are formed as extensions of the vanes 23, are clamped. The safety members or links 25 tangentially respectively bridge the clamping grooves 21. The brake ring 22, pursuant to FIGS. 5 and 6, comprises two friction rings or discs 22A and 22B, which are connected to one another on their inner sides by vanes 27 and 28. The length of the vanes 27 corresponds approximately to the width of the discs 22A and 22B and, together with the vanes 23, form so-called rib-shaped vanes, through which the air is conveyed. The vanes 28, as so-called thermal flow vanes, have a recess 29 which radially and approximately in the shape of a funnel narrows starting from that end of the vanes 28 which is at the inner circumference 30 of the brake ring 22. All the vanes 23, 27 and 28 have a wide base 31 on the interior of the discs 22A and 22B, and taper in the shape of a wedge towards the middle 32 between the two discs (FIG. 6). The ratio of the number of vanes 23 plus 27 to the vanes 28 is 1:8. The width of the bases 31 of at least some of the vanes for increasing air turbulence is greater than 60% of the distance of section 36 from the start of one vane to the start of the next adjacent vane measured along the braking radius. The ratio of the width of the bases 31 of the vanes to the width of the middle of the vanes between the friction ring discs (22A, 22B) is between 4:1 and 2:1; the larger the distance between the friction ring discs, the smaller the ratio.

As shown in FIG. 7, the base 31 of the vanes is about 62% of each section 36, both values being measured along the braking radius 35. The ratio of the vane base 31 to the distance 33 between two adjacent vanes 28, or 27 and 28, at the inner brake ring circumference is 1:1 and should not deviate significantly from this value. The width of the bases 31 of at least some of the vanes is between 80 and 100% of the distance 33 between adjacent vanes measured at the inner circumference of the brake ring, at least some of the vanes having recesses 29. According to FIG. 5, the recesses are funnel shaped and taper radially outwardly from the inner circumference of the brake ring, the length of the recesses equalling ¼ to ¾ of the radial length of the vanes.

The differences between the two brake discs being compared is summarized in Table 1.

Table 1

|  | old construction | new construction |
|---|---|---|
| air inlet cross section | 455 cm² | 630 cm² |
| air outlet cross section | 1035 cm² | 865 cm² |
| total number of vanes | 60 pieces | 72 pieces |
| number of guiding strips | 3 | 4 |
| width of guiding strips | 50 mm | 35 mm |
| weight | 135 kg | 144 kg |
| brake disc diameter | 660 mm | 660 mm |
| brake disc width | 110 mm | 110 mm |
| friction ring thickness | 20 mm | 20 mm |

The following tests were carried out:
(a) Braking Endurance

The testing program for determining the brake disc inertia temperature in the case of braking endurance consisted of continuous braking actions with braking powers of 20, 30 and 40 kW at different speeds, without interruption and without intermediate cooling, over a time period of 6 hours. The details of the testing program are compiled in Table 2.

Table 2

| braking power, in kW |  |  | 20 |  |  | 30 |  |  |  | 40 |  |
|---|---|---|---|---|---|---|---|---|---|---|---|
| braking time, in min | 60 | 30 | 30 | 30 | 30 | 30 | 30 | 30 | 30 | 30 | 30 |
| rotational speed in rev/min | 577 | 433 | 289 | 144 | 692 | 577 | 462 | 346 | 692 | 577 | 462 |
| Speed with a wheel diameter = 920 mm, in km/h | 100 | 75 | 50 | 25 | 120 | 100 | 80 | 60 | 120 | 100 | 80 |
| brake torque, in daNm | 34 | 45 | 67 | 135 | 42 | 51 | 63 | 85 | 56 | 68 | 84 |

Pursuant to this testing program, the results of the comparison between the old brake disc and the brake disc of the present invention are summarized in Table 3.

Table 3

| Braking Power kW | Speed km/h | brake disc inertia temperature in °C | | Difference between the inertia temperatures in °C |
|---|---|---|---|---|
|  |  | old construction | new construction |  |
| 20 | 100 | 206 | 184 | −22 |
|  | 75 | 249 | 228 | −21 |
|  | 50 | 302 | 279 | −23 |
|  | 25 | 389 | 359 | −30 |
| 30 | 120 | 312 | 243 | −69 |
|  | 100 | 315 | 283 | −32 |
|  | 80 | 349 | 306 | −43 |
|  | 60 | 399 | 371 | −28 |
| 40 | 120 | 373 | 311 | −62 |
|  | 100 | 410 | 383 | −27 |
|  | 80 | 448 | 393 | −55 |

The effect of the improved ventilation cooling is shown particularly clearly during increased braking power. The same effect is noticed during constant braking power as a function of the vehicle speed during downhill travel (Absenkfahrten), see braking powers 30 and 40 kW.

If the speed at which the brake endurance is carried out is compared to the respective braking endurance power at an inertia temperature of 375° C, it will be evident that the brake disc formed according to the invention produces a braking endurance power of 40.5 kW at 100 km/h, whereas the known brake disc only reaches a power of 37 kW.

(b) Stopping Over Short Distances

With this test, a predetermined load is simulated on the dynamometer, in which connection, at various conditions sufficient respective braking actions are carried out until the inertia temperature appears in the brake disc. By so doing, the improved ventilation cooling of the brake disc of the present invention becomes obvious when considering, as a function of the vehicle speed, the shortest possible stopping distance which, at an inertia temperature of the brake disc of 375° C, can be maintained for any number of stopping braking actions.

The reduction of the shortest possible stopping distance during stopping braking actions amounts to 200m at 55 km/h, an improvement of 23.80%
240m at 60 km/h, an improvement of 21.81%
260m at 65 km/h, an improvement of 19.54%

At a constant stopping distance of 1000m and under identical conditions, the inertia temperatures compiled in Table 4 occur in the brake discs.

Table 4

| Stopping from speeds, in km/h | inertia temperature in ° C | |
|---|---|---|
| | old construction | new construction |
| 50 | 290 | 255 |
| 55 | 354 | 300 |
| 60 | 395 | 345 |
| 65 | — | 390 |

As shown in Table 4, operating temperatures of the brake discs of the invention are reduced on an average by about 45° C, obviously considerably reducing the wear of the brake lining.

(c) Stopping From High Speeds

In this test in the speed range of 60 to 240 km/h, three stopping braking actions at various decelerations with different wheel loads were carried out at each speed and the brake disc temperatures pertaining thereto were ascertained.

In general, these tests showed that the better ventilated brake discs of the present invention, when stopping from high speeds, have about 30° to 50° C lower temperatures than do the known brake discs. Thus, for example, for a deceleration of 0.8 m/s$^2$ at an 8-ton axle load, it is possible, with the better ventilated brake disc of the present invention, to stop from 239 km/h before the lining limit temperature of 375° C is obtained, whereas with the old brake disc under the same conditions, it is only possible to stop from 216 km/h. Although this corresponds to a speed increase of only 10.6%, for the transformation of energy, however, this means an increase in efficiency of 22%. At a deceleration of 1.0 m/s$^2$, an increase in efficiency of 29% results, and at a deceleration of 1.2 m/s$^2$, an increase in efficiency of 34% results.

Therefore collectively, significant improvements are attained with brake discs pursuant to the present invention.

It is, of course, to be understood that the present invention is by no means limited to the specific showing in the drawings, but also encompasses any modifications within the scope of the appended claims.

What we claim is:

1. A brake disc of cast steel with improved ventilation cooling means, which includes in combination:
    a brake ring comprising two friction ring discs having an inner side and an outer friction surface; and
    vane means interposed between said friction ring discs and connecting same at the bases of said vane means and providing said brake ring with radial ventilation channels for conveying cooling air from the inner circumference of said brake ring to the outer circumference of said brake ring, the ratio of the cross section of the air inlet of said channels to the cross section of the air exit of said channels being between 1:1 and 1:2, at least some of said vane means extending over the inner width of said brake ring, the width of said bases of at least some of said vane means for increasing air turbulence being greater than 60% of the distance from the start of one vane means to the start of the next adjacent vane means measured along the braking radius, the width of said bases of at least some of said vane means being between 80 and 100% of the distance between adjacent vane means measured at the inner circumference of said brake ring, at least some of said vane means having recesses.

2. A brake disc in combination according to claim 1, in which said vane means comprises rib-shaped vanes and thermal flow vanes.

3. A brake disc in combination according to claim 1, in which at least some of said vane means taper in a wedge-like manner from their bases towards their middle between said friction ring discs.

4. A brake disc in combination according to claim 1, in which said recesses are funnel shaped and taper radially outwardly from the inner circumference of said brake ring, the length of said recesses equalling ½ to ¾ of the radial length of said vane means.

5. A brake disc in combination according to claim 1, in which the ratio of the width of said bases of said vane means to the width of the middle of said vane means between said friction ring discs is between 4:1 and 2:1, the larger the distance between said friction ring discs, the smaller the ratio.

* * * * *